C. P. STEINMETZ.
SYSTEM OF ILLUMINATION.
APPLICATION FILED JUNE 21, 1907.
945,990.
Patented Jan. 11, 1910.
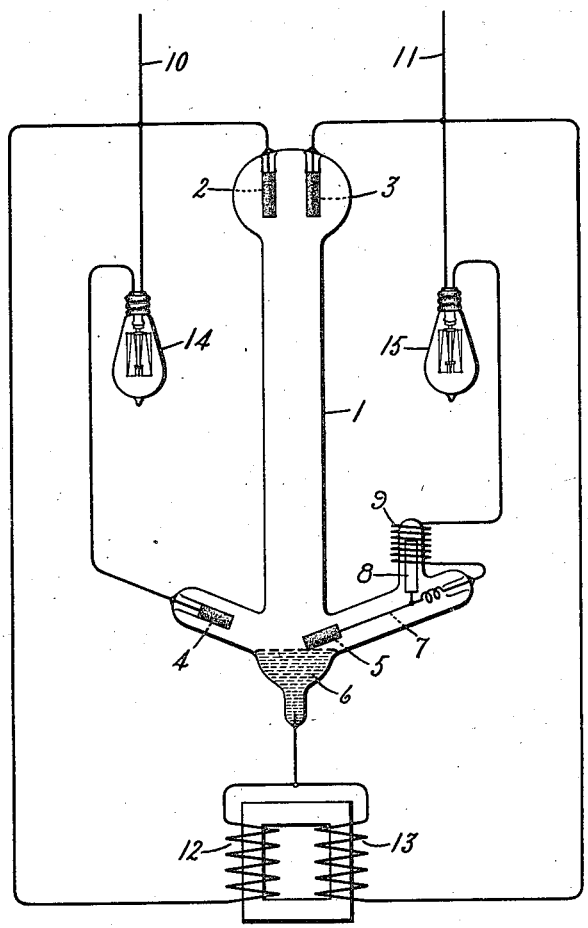
Witnesses:
George W. Tilden.
J. Ellis Glenn
Inventor:
Charles P. Steinmetz,
by
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ILLUMINATION.

945,990.

Specification of Letters Patent.   Patented Jan. 11, 1910.

Application filed June 21, 1907. Serial No. 380,001.

*To all whom it may concern:*

Be it known that I, CHARLES P. STEINMETZ, a citizen of the United States, residing at Schenectady, county of Schenectady, State of New York, have invented certain new and useful Improvements in Systems of Illumination, of which the following is a specification.

My present invention relates to a system of electrical illumination in which a high efficiency of conversion into light is obtained and in which the several elements of the system coöperate to insure a reliable and convenient arrangement. The system includes a vapor electric device such as a mercury lamp; certain anodes of this device are connected in circuit with incandescent lamps in such a way that the current flowing to these anodes traverses the incandescent lamps and renders them effective as sources of illumination.

The details of my invention will be better understood by reference to the following description taken in connection with the drawing accompanying this specification and forming a part thereof.

In the drawing is shown a mercury vapor lamp 1 provided with main anodes 2 and 3, auxiliary anodes 4 and 5, and a mercury cathode 6. The main anodes are mounted in a condensing chamber at the top of the tube and the auxiliary anodes 4 and 5 are mounted on projecting arms located in proximity to the mercury cathode. The anode 5 may be mounted on a flexible conductor 7 in such a way that it is free to move up and down and thereby make and break contact with the mercury cathode 6. This movement may be effected by means of a magnetizable plunger 8 inclosed in a vertical projection of the evacuated envelop and surrounded with a solenoid 9 connected in circuit with the anode.

Electrical energy is supplied to the device through alternating current mains 10 and 11 connected respectively to main anodes 2 and 3 and also connected to cathode 6 through suitable maintaining reactances 12 and 13. The functions of the latter are well understood and need not be set forth herein. The supply mains 10 and 11 are also connected with the auxiliary anodes 4 and 5 and these connections include the incandescent electric lamps 14 and 15. I prefer that these lamps shall be of such a nature as to have a positive temperature coefficient so that their resistance at starting will be comparatively low and will increase rapidly as the flow of current increases. Tungsten lamps possess such characteristics and are well adapted for use in this relation.

At starting, the auxiliary anode 5 is in contact with the mercury cathode 6 and energy flows from the distributing main 11 through incandescent lamp 15 and solenoid 9 to anode 5 and then through cathode 6 and reactance 12 back to the other main. This current energizes the solenoid and lifts the anode, thereby producing a starting arc at the surface of the cathode. The low initial resistance of the incandescent lamp 15 permits a relatively heavy starting current and the side branch arc maintained at cathode 6 by anodes 4 and 5 will be ample to ionize the entire tube and start the flow of current from main anodes 2 and 3. As soon as the main anodes start, the flow of current to the auxiliary anodes reduces greatly; it does not however entirely cease. There is no necessity for continuing the flow of current from anodes 4 and 5 after the lamp starts and, in fact, so far as the vapor device is concerned, the continuance of current through these auxiliary anodes represents consumption of energy with very little return in light. By the use, however, of incandescent lamps 14 and 15, this diverted current, or as we may call it, leakage current, is put to a useful purpose. Moreover, by permitting the currents between the auxiliary anodes and the cathode to flow, the stability of the lamp is increased so that if desired the current in the main arc or arcs may be run at a lower value than would otherwise be possible. This permits the lamp to be made in smaller light units.

The incandescent lamps are preferably of such resistance that the greater part of the energy flowing therethrough is consumed in the lamp and not in the starting arcs. This is very easily accomplished, particularly if we use metal filament lamps having a low starting resistance and a high running resistance. The low starting resistance permits the passage of ample starting current through the vapor device and the high running resistance concentrates in the lamp the greater proportion of the energy dissipated in the starting circuit during normal operation of the system.

The system as a whole is entirely automatic and self starting and the light obtained is orthochromic in character and therefore, for certain purposes, of better quality than that produced solely by a mercury vapor device.

What I claim as new and desire to secure by Letters Patent of the United States, is,—

1. The combination of a vapor electric device having main anodes and a cathode, auxiliary anodes for said device, and a metal filament lamp permanently connected in circuit with each auxiliary anode.

2. The combination of a vapor electric device, means for passing current therethrough, a starting anode for said device, and a tungsten lamp in circuit with said starting anode to limit the flow of current thereto and to convert into light the greater part of the energy passing by way of said anode during the normal operation of the vapor device.

3. The combination of a vapor electric device having main anodes and a cathode, a source of alternating current connected to said anodes, starting anodes for said vapor device, and metal filament lamps connected between said starting anodes and said source of alternating current.

4. The combination of a vapor electric device having a main anode and a cathode, means for passing current from said anode to said cathode, a starting anode for said device, and a metal filament lamp connected between said starting anode and said main anode.

5. The combination of an alternating current source, a vapor electric device having anodes connected therewith, a cathode for said device, auxiliary anodes in proximity to said cathode, metal filament lamps connecting said auxiliary anodes with said main anodes, and means for returning current from said cathode to said source of alternating current.

6. The combination of a vapor electric device, means for supplying current thereto, a continuously operating side branch path for said device, and a tungsten lamp consuming the greater part of the energy of the current passing through said side branch path.

7. The combination with a vapor electric device having a main anode, a cathode and a movable auxiliary anode initially contacting with said cathode, of electrically operated means for moving said auxiliary anode, and a metal filament lamp in circuit with said auxiliary anode and said electrically operated means.

8. The combination of a vaporizable cathode, main anodes for supplying current to said cathode through a relatively long vapor path, auxiliary anodes supplying additional current to said cathode through short vapor paths, and incandescent lamps in circuit with said auxiliary anodes and of such resistance that the energy consumption of a lamp is greater than that of the corresponding short vapor path.

In witness whereof, I have hereunto set my hand this 19th day of June, 1907.

CHARLES P. STEINMETZ.

Witnesses:
 BENJAMIN B. HULL,
 HELEN ORFORD.